3,482,509
SANDWICH COOKING AND DISPENSING
MACHINE
John D. L. Gardner, 401 1st Savings Bldg.,
Houston, Tex.
Filed Nov. 28, 1967, Ser. No. 686,109
Int. Cl. G07f 11/72, 11/70
U.S. Cl. 99—357       3 Claims

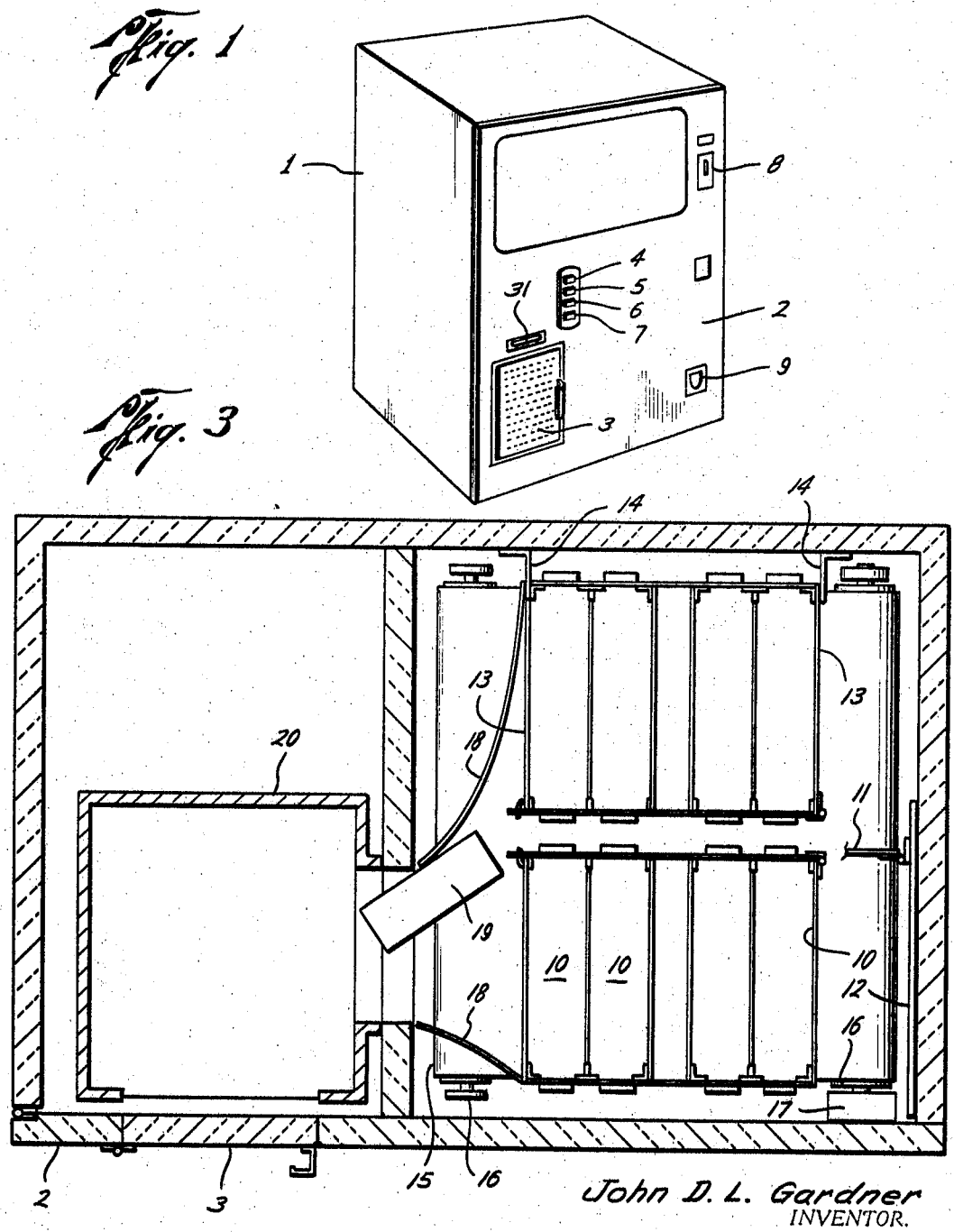

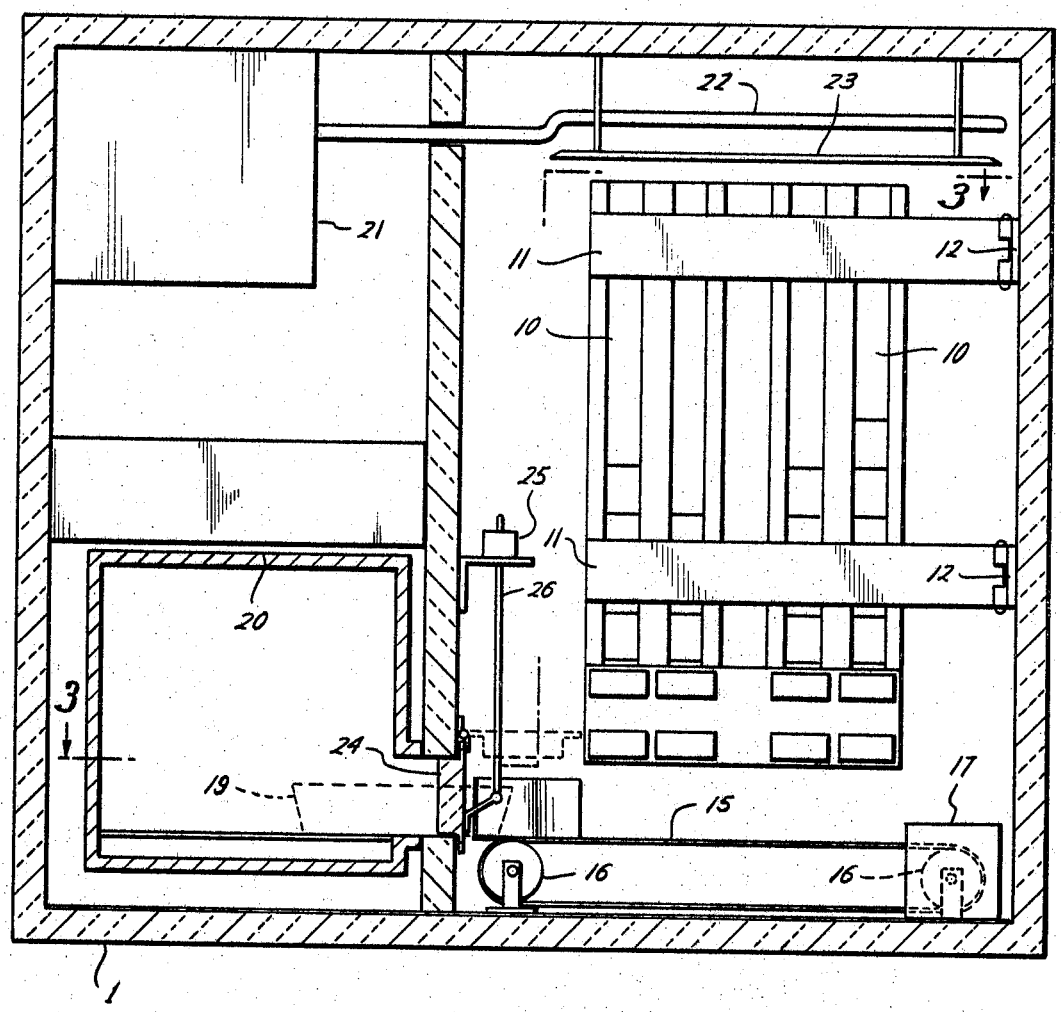

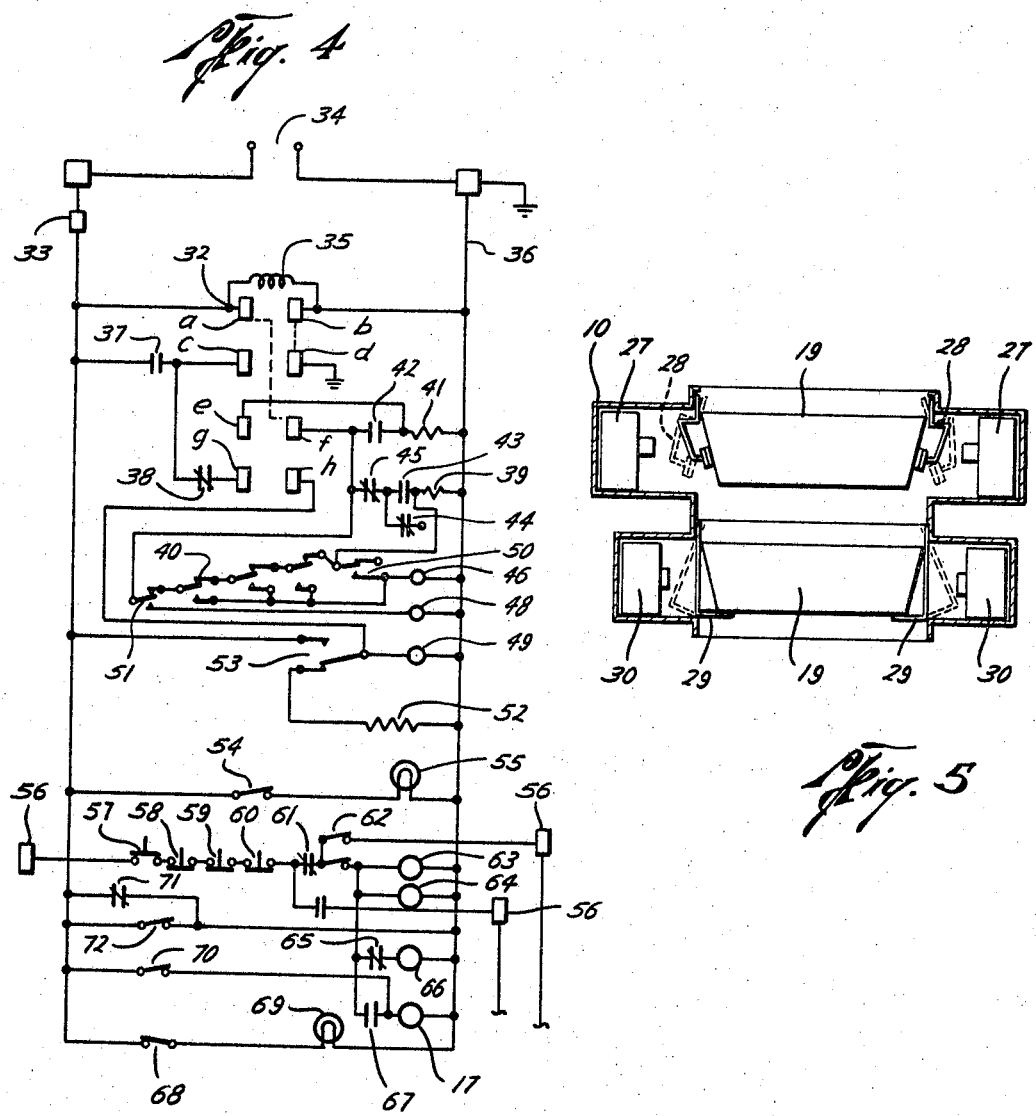

ABSTRACT OF THE DISCLOSURE

A sandwich cooking and dispensing machine having a series of shafts forming storage chambers and switch controlled gates at the terminal of each shaft, switches for selectively opening said gates to deliver one of said sandwiches to a cooking unit, means for receiving a container and sandwich from said shaft and transporting same into a cooking cavity having a micro wave cooking unit, means for indicating on the front panel of said machine when the cooking process has been completed, and means for permitting said cooked sandwich to be removed.

SUMMARY OF THE INVENTION

A sandwich dispensing device having a series of storage shafts forming chambers, refrigeration means adjacent said shafts, gates at the terminals of each shaft, coin operated means for selectively opening said gates, a micro wave cooking unit in said housing, a transport beneath said shafts for transporting a sandwich released from one of said shafts into said cooking unit and means for sealing said cooking unit area from said refrigerated area during the cooking process.

BRIEF DESCRIPTION OF THE DRAWING

FIGURE 1 is a front perspective view of the device.
FIGURE 2 is a side elevational view, with the front panel removed.
FIGURE 3 is a top plan view of the device, taken on line 3—3 of FIGURE 2.
FIGURE 4 is a diagrammatic sketch of the electric circuits employed, and
FIGURE 5 is a side elevational, enlarged, cross sectional view of the gates employed.

DESCRIPTION OF THE PREFERRED EMBODIMENT

In the drawings the numeral 1 designates a housing of any suitable material for refrigerated units, on which the front door 2 is hinged. In the front door 2 are the access door 3, and the selection controls 4, 5, 6, 7 and the coin receiving slot 8, and coin return chamber 9.

In the housing 1 are the storage shafts 10, 10, one series of said shafts being mounted on the hinged plates 11, 11 which in turn are slidably mounted on the hinge mounts 12, 12, and the series of shafts 13, 13 are mounted on the supports 14, 14. A traveling belt 15 is mounted on the spindles 16, 16 beneath the shafts 10, 13, and a motor 17 drives the belt 15. Yieldable guide members 18, 18 are mounted on the housing and positioned immediately above the belt 15, to direct sandwich containers 19 into a cooking chamber 20.

A compressor 21 and refrigerator coils 22 are mounted in the upper end of the housing 1 and a coil drip pan 23 is suspended from the top of the housing to a point beneath the coils 22.

A gate 24 normally closes the entrance into the cooking compartment 20 and a solenoid 25 actuates the rod 26, which is connected to the gate 24, to open the gate and permit entrance of a sandwich container 19.

The lower terminal of each shaft 10, 13 is provided with the gates having electromagnetic switches 30, 30, which actuate the arms 29, 29, and a reload gate having the magnetic switches 27, 27 actuating the arms 28, 28 are located immediately above the terminal gate.

The circuit is shown in FIGURE 4, and is described as follows: The source of power is from the usual outlet which passes through the male plug 32, which is an eight prong plug, protected by the ten amp fuse 33, from the outlet 34, the prongs of the plug being designated as a, b, c, d, e, f, g, h. The heater 35 is grounded through the common ground wire 36, and the vending switch 37, connected into the prong c, is grounded through the prong d, and is tied into the normally closed switch 38 which is in turn tied into the coin return solenoid 39, through the selective coin operated switches 40. The prongs e and f are for the escrow control, being tied into the escrow solenoid 41 which actuates the normally open switch 42 to return a coin where a vend is not made.

The solenoid 39 controls the normally open coin return switch 43, and the normally closed coin return switch 44. The manual cancel switch 45 is closed by the customer to close the switch 39. When the switch 45 is so closed, the solenoid 39 actuates the switch 44 and returns the coin.

The coin operated switches 40, commonly referred to as stepping relay vend switches, are standard equipment. The switch 46 is a standard relay for completing the circuit and when this has closed, the timer motor 48 is actuated through the plug prong h, this motor being a standard timing device, and this starts the timing process, and after the timer has completed its cycle, the reset switch 49 is actuated to reset the stepping switches. The switches 50, 51 starting the motor and stopping it, and upon reset, actuating the solenoid 52 through the switch 53, which releases the coins into the cash box (not shown).

In the event that the supply of product in a particular shaft is exhausted, the switch for that shaft, as 54, will be closed and the light 55 will be ignited. The power supply for this comes through the female plug 56, and the line leading from this plug has the selector switches 57, 58, 59 and 60, controlled by the selector controls 4, 5, 6 and 7.

In use the stacks will be supplied with various types of sandwiches, such as hot dogs with onions, and another without onions, etc., and when a customer operates one, such as 57, the remaining switches are locked against actuation through the switch 61 and closed switch 62 activates the relay 63 and the time delay relay 64, and the time delay relay 65 which in turn activates the product delivery relay 66 and the normally open time delay relay 67 which operates the motor 17. After the preset time delay, the product is delivered into the oven which has its own self-contained relay for actuating (not shown), at which time the ready light switch 68 closes, illuminating the ready light 69. The bypass switch 70 closes when any selector button is actuated, which will permit circuit only through the one gate. The time delay relay 71 closes when any one of the selector buttons is activated, which closes the switch 72, permitting circuit through respective motors. The coin relay 63 excites the electromagnet 30 opening the gate 29, and when the delay relay 64 closes, the electromagnet 27 is excited, opening the gates 28, 28.

A customer wanting to purchase a sandwich, such as a hot dog, selects from the row of switches 4, 5, 6, 7. These switches control the respective gates, as 28, 29, at the lower ends of the shafts 10, 13, and closing these switches will excite the switches 30, 30, opening the gates 29, 29, permitting the container 10 to drop on to the transport 15, and the gates 28, 28 will be opened after the time delay, by the electromagnets 27, 27, dropping the container held thereby onto the gates 29, 29. The actuation of the selector button starts the motor 17, rotating the spindle 16 and moving the belt 15, and carrying the container 19 against the guides 18, 18 where it will be directed into the cooking cavity 20, where it will be subjected to the action of the micro-wave oven for quick cooking, and when the light 31 is illuminated, the customer may open the door 3 and take the sandwich from the cavity 20. When one of the switches 4, 5, 6, 7 is activated, the solenoid 25 will be activated, lifting the cavity door 24 and holding said door open by means of the time delay relay, until said container 19 has entered the cavity 20, and as the door 24 closes, the container 19 will be moved fully within the cavity 20.

When it is desired to refill the shafts 10, 13, the door 2 is opened, and the hinged straps 11, 11 moved outwardly on the slide mounts 12, 12, until the door formed by the straps 11, 11 and the shafts 10, 10 may be swung outwardly, exposing the shafts 13 and 10.

I claim:

1. In a food dispenser, a housing, shafts forming food storage chambers in said housing, refrigerating means in said housing, a micro-wave cooking unit in said housing, said chambers being adapted to receive food containers therein, means for activating said cooking units and for selectively causing the free fall of a food container out of one of said chambers, means for moving said container into said cooking unit consisting of a traveling belt mounted immediately below said chambers, guides adjacent said chambers and extending over said belt for guiding said containers into said cooking unit and means for indicating when said food container may be removed from said housing by a user.

2. The device defined in claim 1 wherein each chamber is provided with a pair of gates at its lower end, each of said gates being normally closed, electromagnetic switches controlling said gates to permit the lowermost food container to be dispensed on to said moving means.

3. The device defined in claim 1 wherein each chamber is provided with a pair of superimposed gates adapted to releasably hold food containers therein, electromagnetic controls in series to open the lower-most gate upon deposit of a predetermined coin value and permit the food container held thereby to drop on to the moving means, and after a predetermined time delay, open the uppermost gate and drop the food container held thereby on to the lowermost gate, and to receive on the uppermost gate another food container from the chamber.

References Cited

UNITED STATES PATENTS

| | | | |
|---|---|---|---|
| 2,142,053 | 12/1938 | Hoban | 221—298 XR |
| 2,901,964 | 9/1959 | Johnson | 99—357 XR |
| 2,950,024 | 8/1960 | Adler | 99—357 |
| 2,989,165 | 6/1961 | Cozart | 221—129 XR |
| 2,990,973 | 7/1961 | Chazen | 99—357 XR |
| 3,000,539 | 9/1961 | Danziger et al. | 221—129 |
| 3,055,548 | 9/1962 | Allegri | 221—150 |
| 3,233,536 | 2/1966 | Ignelzi | 99—357 |
| 3,333,666 | 8/1967 | Murray et al. | 99—357 XR |
| 3,335,656 | 8/1967 | Smith | 99—357 |
| 3,386,550 | 6/1968 | Murray et al. | 99—357 XR |

BILLY J. WILHITE, Primary Examiner

U.S. Cl. X.R.

221—114, 129, 150, 298